(12) United States Patent
Gotou

(10) Patent No.: US 7,069,721 B2
(45) Date of Patent: Jul. 4, 2006

(54) EXHAUST EMISSION CONTROL SYSTEM FOR INTERNAL COMBUSTION ENGINE AND EXHAUST EMISSION CONTROL METHOD

(75) Inventor: Isamu Gotou, Suntou-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 38 days.

(21) Appl. No.: 11/016,921

(22) Filed: Dec. 21, 2004

(65) Prior Publication Data

US 2005/0166582 A1    Aug. 4, 2005

(30) Foreign Application Priority Data

Feb. 2, 2004   (JP)   ............... 2004-025811

(51) Int. Cl.
*F01N 3/00* (2006.01)
*F01N 3/02* (2006.01)

(52) U.S. Cl. ............... 60/297; 60/295; 60/311
(58) Field of Classification Search ............ 60/295, 60/297, 311
See application file for complete search history.

(56) References Cited

U.S. PATENT DOCUMENTS

| | | | |
|---|---|---|---|
| 5,287,698 A * | 2/1994 | Shinzawa et al. | 60/286 |
| 6,405,528 B1 * | 6/2002 | Christen et al. | 60/295 |
| 6,708,487 B1 * | 3/2004 | Morimoto et al. | 60/311 |
| 6,845,265 B1 * | 1/2005 | Thacker | 600/547 |
| 2004/0194450 A1 * | 10/2004 | Tanaka et al. | 60/285 |

FOREIGN PATENT DOCUMENTS

| | | |
|---|---|---|
| EP | 1 229 223 A1 | 8/2002 |
| EP | 1229223 A1 * | 8/2002 |
| FR | 2 801 635 A | 6/2001 |
| JP | A 5-288037 | 11/1993 |
| JP | A 7-189656 | 7/1995 |
| JP | A 8-61044 | 3/1996 |
| JP | A 2003-83036 | 3/2003 |

* cited by examiner

*Primary Examiner*—Thomas Denion
*Assistant Examiner*—Loren Edwards
(74) *Attorney, Agent, or Firm*—Oliff & Berridge, PLC

(57) ABSTRACT

An exhaust emission control system for an internal combustion engine includes a filter that traps particulate matters and ash and a controller that starts a filter recovery process by controlling a temperature of the filter to a target temperature to bring an inside of the filter into an oxidizing atmosphere such that the particulate matter trapped and accumulated on the filter is removed through oxidization when an estimated amount of the particulate matters trapped and accumulated on the filter exceeds a predetermined amount. The target temperature is set based on the estimated amount of the ash trapped and accumulated on the filter. Even if the amount of the accumulated particulate matter per unit volume is increased owing to accumulation of the ash on the filter, and oxidization reaction speed of the particulate matter may be reduced, thus preventing excessive temperature increase in the filter.

11 Claims, 3 Drawing Sheets

EXHAUST EMISSION CONTROL SYSTEM FOR INTERNAL COMBUSTION ENGINE AND EXHAUST EMISSION CONTROL METHOD

INCORPORATION BY REFERENCE

The disclosure of Japanese Patent Application No. 2004-025811 filed on Feb. 2, 2004, including the specification, drawings and abstract are incorporated herein by reference in its entirety.

BACKGROUND OF THE INVENTION

1. Field of Invention

The invention relates to a recovery process applied to a particulate filter that purifies exhaust gas discharged from an internal combustion engine, for example, a diesel engine and the like.

2. Description of Related Art

The process for reducing particulate matters (hereinafter referred to as PM), for example, soot and the like discharged from a vehicle driven by an internal combustion engine into atmosphere has been increasingly desired. There has been introduced a well known particulate filter (hereinafter simply referred to as a filter) that traps the PM discharged from the internal combustion engine disposed in an exhaust passage of the internal combustion engine in response to the aforementioned needs.

As more and more PM is trapped by the filter, the filter tends to have clogging, and accordingly the exhaust resistance increases, thus reducing outputs of the internal combustion engine. It is necessary to perform a filter recovery process to remove the PM trapped and accumulated on the filter through oxidization. Generally the filter recovery process is performed by injecting a fuel in the expansion stroke or the exhaust stroke during the operation of the internal combustion engine, that is, performing a post injection. Then the filter is brought into an oxidizing atmosphere (in excess of oxygen) while being heated until its temperature becomes 650° C. at which the PM can be oxidized. It is well known that the amount of the PM accumulated on the filter is estimated based on the differential pressure of the filter, and the filter recovery process is performed when the estimated accumulated PM amount exceeds a predetermined value.

The filter may trap the engine oil, certain substance contained in the fuel, or ash such as the oxidized scale in addition to the PM as the internal combustion engine is operated. As the trapped ash amount is increased, the differential pressure of the filter becomes higher.

If the accumulated PM amount is estimated based on the differential pressure of the filter, the accumulated ash amount may be measured as the accumulated PM amount. Accordingly it is determined that the amount larger than the actual amount of the accumulated PM is estimated. The filter recovery process is then performed even if the actual accumulated PM amount is small. This may reduce the time interval for performing the filter recovery process, thus deteriorating the fuel efficiency.

In JP-A-2003-83036, the ash amount that resides in the filter is derived from the differential pressure of the filter immediately after the filter recovery process. The derived residual ash amount is subtracted from the accumulated PM amount that has been estimated based on the differential pressure. The subsequent filter recovery process is started when the resultant accumulated PM amount exceeds a predetermined value.

As the amount of the ash trapped on the filter increases, the capacity of the filter for trapping the PM is decreased. In the aforementioned technology that starts the filter recovery process when the trapped PM amount obtained by excluding the ash amount from the PM amount estimated based on the differential pressure exceeds the predetermined value, the accumulated PM amount per unit volume is increased to be larger than that in the case where no ash is accumulated. This may cause the temperature of the filter to increase excessively owing to the oxidizing reaction of the PM upon recovery of the filter. Accordingly, the excessive temperature increase may melt or damage the filter.

SUMMARY OF THE INVENTION

It is an object of the invention to provide an exhaust emission control system for an internal combustion engine, in which a filter recovery process is performed while keeping the temperature of the filter from excessively increasing and avoiding deterioration in the fuel efficiency.

An exhaust emission control system for an internal combustion engine includes a filter which is provided in an exhaust passage of the internal combustion engine so as to trap a particulate matter and ash contained in exhaust gas, and a controller that estimates an amount of the particulate matter trapped and accumulated on the filter, estimates an amount of the ash trapped and accumulated on the filter, and issues a command to start a filter recovery process by controlling a temperature of the filter to a target temperature to bring an inside of the filter into an oxidizing atmosphere such that the particulate matter trapped and accumulated on the filter is removed through oxidization when the estimated amount of the particulate matter trapped and accumulated on the filter exceeds a predetermined amount. In the exhaust emission control system, the target temperature is set by the controller based on the estimated amount of the ash trapped and accumulated on the filter.

In the aforementioned system, the amount of the PM trapped and accumulated on the filter may be estimated based on a total value of the engine speed and the load, or the total value of the fuel injection quantity calculated from completion of the preceding filter recovery process.

The amount of the ash accumulated on the filter may be estimated based on, for example, the difference between the differential pressure of the filter right before the filter recovery process and the differential pressure of the filter right after the filter recovery process, or based on the differential pressure of the filter right after the filter recovery process.

The capacity of the filter for trapping the PM or ash is kept constant. Assuming that the same amount of the PM is accumulated on the filter, the PM accumulated amount per unit volume may vary depending on the amount of the ash accumulated on the filter. The speed of the PM oxidizing reaction is changed as the amount of accumulated PM per unit volume varies. That is, the speed of the PM oxidizing reaction increases as the amount of accumulated PM per unit volume becomes large. The resultant heat generated by the reaction may cause the filter temperature to sharply increase. Meanwhile, in the exhaust emission control system according to the invention, the target temperature of the filter is set based on the estimated amount of ash accumulated on the filter. The target temperature of the filter during the filter recovery process is set in consideration with the temperature increase owing to the oxidizing reaction of the PM. This may prevent excessive temperature rise in the filter owing to increase in the oxidizing reaction speed of the PM.

In the aforementioned system, the filter recovery process is started always when the amount of the PM accumulated on the filter becomes equal to or larger than the predetermined value. Even if the amount of the ash accumulated on the filter is increased, the time interval for performing the filter recovery process is not unnecessarily reduced while preventing deterioration in the fuel efficiency at the filter recovery process.

When the estimated amount of the ash is equal to or larger than a threshold value, the target temperature is determined to be lower than the target temperature to be set when the estimated amount of the ash is smaller than the threshold value. Assuming that the same amount of the PM is trapped and accumulated on the filter, if the amount of the ash trapped and accumulated on the filter is equal to or larger than the threshold value, the amount of the accumulated PM per unit volume is larger than that in the case where the amount of the ash trapped and accumulated on the filter is smaller than the threshold value. The thus set target temperature may reduce the PM oxidizing reaction speed, thus preventing excessive increase in the filter temperature.

It is preferable to set the threshold value to the maximum value of the amount of the accumulated ash, which may keep the filter temperature from being excessively increased to be melted during the filter recovery process at the target temperature at which no ash is accumulated in the state where the predetermined amount of the PM is accumulated on the filter.

When the estimated amount of the ash is equal to or larger than the threshold value, the target temperature is determined to be lower than the target temperature to be set when the estimated amount of the ash is smaller than the threshold value for a predetermined period of time elapsing from the start of the filter recovery process. The oxidizing reaction speed of the PM becomes low at the low target temperature of the filter during the filter recovery process, and accordingly the amount of removed PM through oxidation per unit of time is reduced. If the filter recovery process is performed at the lower target temperature of the filter, the time required for performing the filter recovery process will be extended, thus deteriorating the fuel efficiency. Therefore, the target temperature of the filter is lowered for a predetermined period of time rather than over the entire period of the filter recovery process, thus preventing deterioration in the fuel efficiency.

Preferably the predetermined period of time is set to be taken for the estimated amount of the particulate matter to become equal to or smaller than a reference value. It is preferable to set the reference value to the maximum value of the PM accumulated amount that may not cause excessive temperature increase to melt the filter even if the filter recovery process is performed at the target temperature of the filter with no accumulated ash in the state where the accumulated ash amount is the threshold value.

It is preferable to calculate an amount of the particulate matter that has been removed through oxidation after the start of the filter recovery process, and subtract the calculated amount of the removed particulate matter from the predetermined amount of the particulate matter so as to obtain an amount of the particulate matter accumulated on the filter. This makes it possible to obtain the amount of the accumulated PM during the filter recovery process accurately.

In an exhaust emission control method for an internal combustion engine, in which a filter provided in an exhaust passage of the internal combustion engine is used to trap a particulate matter and ash contained in exhaust gas, an amount of the particulate matter trapped and accumulated on the filter is estimated, an amount of the ash trapped and accumulated on the filter is estimated, and a filter recovery process is started by controlling a temperature of the filter to a target temperature to bring an inside of the filter into an oxidizing atmosphere such that the particulate matter trapped and accumulated on the filter is removed through oxidization when the estimated amount of the particulate matter trapped and accumulated on the filter exceeds a predetermined amount. In this method, the target temperature is set based on the estimated amount of the ash trapped and accumulated on the filter.

As mentioned above, in the exhaust emission control system for the internal combustion engine and the exhaust emission control method according to the invention, the filter recovery process is performed while avoiding excessive filter temperature increase. Even if the amount of the ash accumulated on the filter is increased, the time interval for the filter recovery process is not unnecessarily reduced, thus preventing deterioration in the fuel efficiency.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENT

Figure 1:
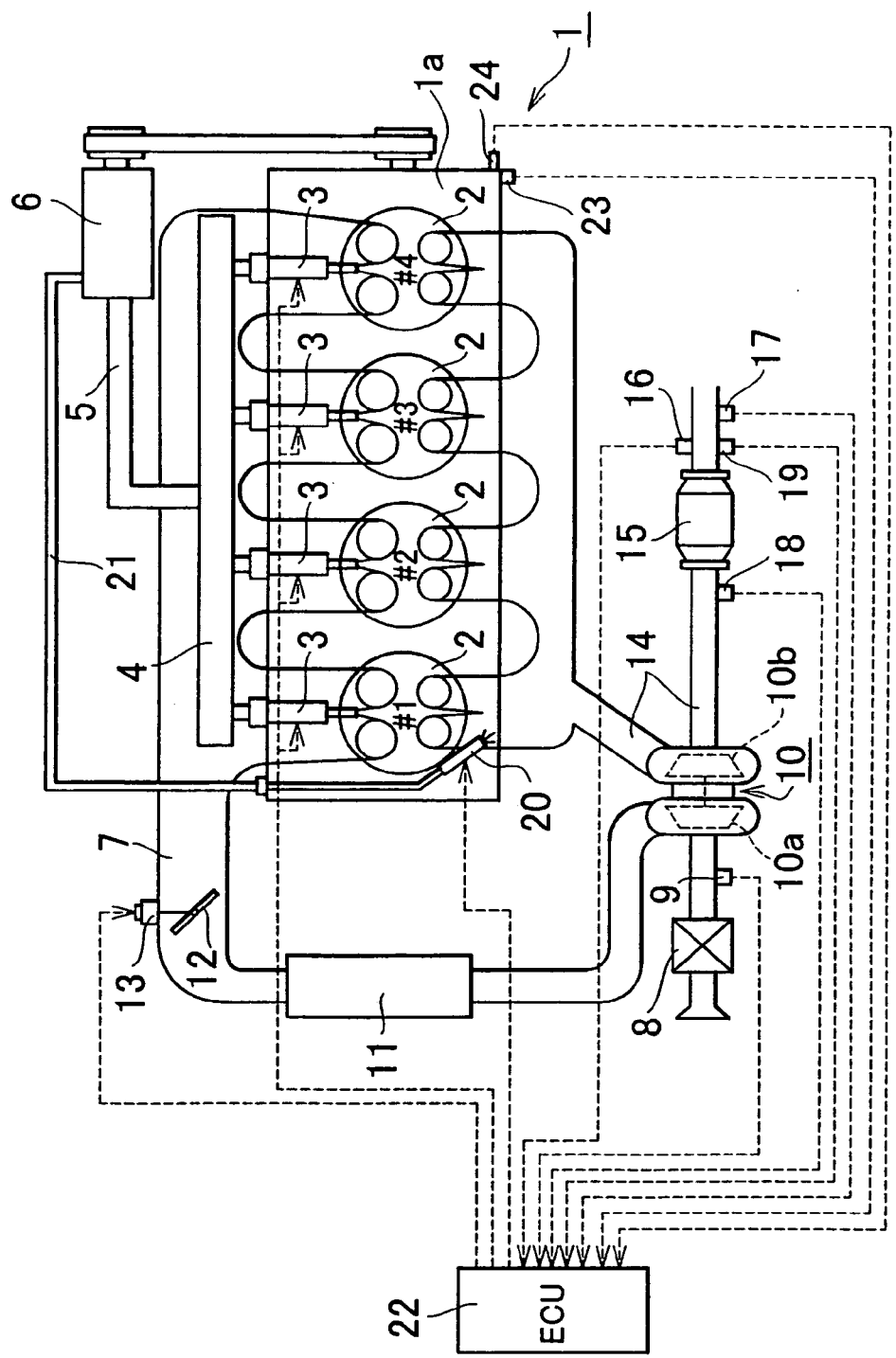
FIG. 1 is a view schematically showing the structure of an exhaust emission control system according to an embodiment and an internal combustion engine that employs the exhaust emission control system.

An embodiment of the invention will be described referring to the drawings. Unless otherwise specified, each size, material, shape of the respective elements, and the relative position thereof described in the embodiment may be arbitrarily determined within a scope of the invention.

First Embodiment

FIG. 1 is a view that schematically shows the structure of an internal combustion engine that employs an exhaust emission control system according to the embodiment of the invention, and the structure of an intake/exhaust system therein.

Referring to FIG. 1, an internal combustion engine 1 is a 4-cycle diesel engine of water-cooling type including four cylinders 2, which is provided with fuel injection valves 3 through which fuel is directly injected into each combustion chamber of the cylinders 2, respectively. The respective fuel injection valves 3 are connected to an accumulator (common rail) 4 communicated with a fuel pump 6 via a fuel supply pipe 5.

The internal combustion engine 1 is connected to an intake passage 7 to which an air cleaner box 8 is connected. The intake passage 7 is provided with an air flow meter 9 at a position downstream of the air cleaner box 8 for outputting an electric signal corresponding to the mass of intake air that circulates within the intake passage 7.

The intake passage 7 is provided with a compressor housing 10a that houses a supercharger 10 at a position downstream of the air flow meter 9. The intake passage 7 is provided with an intercooler 11 at a position downstream of the compressor housing 10a. The intake passage 7 is provided with an intake throttle valve 12 that adjusts a flow rate of the intake air circulating within the intake passage at a position downstream of the intercooler 11. The intake throttle valve 12 is provided with an intake throttle actuator 13.

The internal combustion engine 1 is connected to an exhaust passage 14 to which a muffler is connected at downstream side. A turbine housing 10b that houses the supercharger 10 is provided in the middle of the exhaust passage 14. A filter 15 for trapping the PM contained in the exhaust gas discharged from the cylinder 2 is provided at a position downstream of the turbine housing 10b in the exhaust passage 14. The filter 15 may be structured by carrying the oxidizing catalyst, $NO_x$ absorbing/reducing catalyst, three-way catalyst and the like on the particulate filter.

The exhaust passage 14 downstream of the filter 15 is provided with an air/fuel ratio sensor 16 that outputs an electric signal corresponding to an air/fuel ratio of the exhaust gas that flows through the exhaust passage 14, and an exhaust air temperature sensor 17 that outputs an electric signal corresponding to a temperature of the exhaust gas that flows through the exhaust passage 14. The exhaust passage 14 is further provided with an upstream pressure sensor 18 and a downstream pressure sensor 19 at positions upstream and downstream of the filter 15, respectively.

An exhaust port of the cylinder No. 1 of the internal combustion engine 1 is provided with a fuel addition valve 20 that serves to add the fuel as the reducing agent into the exhaust gas flowing through the exhaust port. The fuel addition valve 20 is connected to the fuel pump 6 via a fuel passage 21.

The above structured internal combustion engine 1 includes an electronic control unit (ECU) 22 for controlling operations of the internal combustion engine 1. The ECU 22 including a CPU, a ROM, a RAM, a back-up RAM and the like is formed as an arithmetic-logic circuit.

The ECU 22 is connected to various sensors, for example, a crank position sensor 23 and a water temperature sensor 24 provided in the internal combustion engine 1, an accelerator position sensor (not shown) provided in the interior of the vehicle employing the internal combustion engine 1 in addition to the aforementioned air flow meter 9, air/fuel ratio sensor 16, exhaust gas temperature sensor 17, upstream pressure sensor 18, and the downstream pressure sensor 19 via electric wiring. Signals output from the aforementioned sensors are input to the ECU 22.

The ECU 22 is connected to the fuel injection valve 3, the intake throttle actuator 13, the fuel addition valve 20 and the like via electric wiring for controlling those elements.

The ECU 22 executes a basic control routine at a predetermined time interval so as to input signals output from the respective sensors, and to calculate the engine speed, fuel injection quantity, fuel injection timing and the like. The control values input or calculated by the ECU 22 are temporarily stored in the RAM of the ECU 22.

The ECU 22 further executes an interruption process triggered by an input of the signal from various sensors or switches, passage of a predetermined time, or an input of a pulse signal from the crank position sensor 23 so as to read the various control values from the RAM, based on which the fuel injection valve 3 and the like are controlled.

The ECU 22 executes the filter recovery process periodically as the interruption routine based on the crank position sensor 23 or the interruption routine at a predetermined time interval as described below.

The ECU 22 starts the filter recovery process when a condition of the recovery process applied to the filter 15 (hereinafter referred to a filter recovery process condition) is established. The aforementioned condition is determined as being established when the amount of the PM trapped and accumulated on the filter 15 is equal to or larger than a predetermined value. The predetermined value is preliminarily set for the internal combustion engine independently, which is smaller than the accumulated amount that may clog the filter 15 to increase the exhaust resistance, and accordingly reduce outputs of the engine.

The ECU 22 estimates the amount of the PM accumulated on the filter after completion of the filter recovery process based on the total value of the fuel injection quantity, or the engine speed and the load calculated after completion of the preceding filter recovery process. The ECU 22 determines whether the amount of the PM accumulated on the filter 15 is equal to or larger than the predetermined value.

If it is determined that the filter recovery process condition is established, the ECU 22 serves to increase the temperature of the filter 15 to the higher target temperature at which the PM is oxidized, and further to control the air/fuel ratio so as to bring the exhaust gas flowing into the filter 15, that is, the inside of the filter 15 into the oxidizing atmosphere.

There are two types of process for increasing the filter temperature as below. (1) The exhaust gas temperature is increased to transfer heat of the exhaust gas to the filter 15. (2) In the case where the filter 15 carries the catalyst, the unburned fuel is oxidized by the catalyst, and the resultant reaction heat is used to increase the temperature of the filter 15.

With respect to the process (1), the timing for injecting the fuel through the fuel injection valve 3 in the internal combustion engine 1 may be delayed to retard the combustion timing of the air/fuel mixture. Alternatively the fuel is injected through the fuel injection valve 3 of the cylinder 2 secondarily in the expansion stroke of the internal combustion engine 1 so as to extend the combustion period.

With respect to the process (2), the fuel is added to the exhaust gas through the fuel addition valve 20. Alternatively the fuel is injected through the fuel injection valve 3 of the cylinder 2 secondarily in the exhaust stroke of the internal combustion engine 1.

In the case where the process for injecting the fuel through the fuel injection valve 3 secondarily or for adding the fuel into the exhaust gas through the fuel addition valve 20 is employed, the air/fuel ratio control is executed such that the air/fuel ratio of the exhaust gas flowing into the filter 15 becomes lean by controlling the fuel quantity secondarily injected through the fuel injection valve 3 or the fuel quantity added into the exhaust gas through the fuel addition valve 20.

As the filter recovery process is executed, the PM trapped and accumulated on the filter 15 is oxidized so as to be removed therefrom. Upon passage of a predetermined time from start of the filter recovery process (hereinafter referred to a processing period), the execution of the filter recovery process ends. The processing period is preliminarily determined such that the PM accumulated on the filter 15 is completely removed. The time period taken for the PM to be completely removed through oxidization becomes different as the PM oxidizing reaction speed varies depending on the filter temperature. Accordingly the processing period may be changed in accordance with the filter temperature during the filter recovery process and the map that has been experimentally prepared.

As the internal combustion engine is operated, the filter 15 traps the engine oil, certain substance contained in the fuel, and ash such as oxidized scale which cannot be burned by the filter recovery process. As the amount of the ash trapped on the filter is increased, the capacity of the filter for trapping the PM is reduced. When the filter recovery process is started upon establishment of the filter recovery process condition, the amount of accumulated PM per unit volume is increased by the amount corresponding to the accumulated amount of the ash because of substantially constant amount of the accumulated PM.

If the filter recovery process is performed for the film 15 having a large amount of ash accumulated thereon in the same way for the film 15 having no ash accumulated thereon, the PM oxidizing reaction speed increases as the PM accumulated amount per unit volume has been increased. This may sharply increase the filter temperature, thus melting or damaging the filter.

In the embodiment, it is determined whether the amount of the ash accumulated on the filter 15 is equal to or larger than a threshold value. If it is determined that the amount of the ash is equal to or larger than the threshold value, the target temperature of the filter is decreased to be lower than the one during the filter recovery process. That is, the target temperature for the aforementioned temperature increasing process is decreased to be in the range from the value equal to or higher than the minimum temperature at which the PM is removed through oxidization (for example, about 400° C.) to the value at which the recovery process is performed for the filter 15 having no ash accumulated thereon (for example, about 650° C.).

The aforementioned temperature increasing process while lowering the target temperature, and the filter recovery process for controlling the air/fuel ratio as aforementioned will be referred to a "low temperature recovery process" hereinafter. The temperature increasing process at the same target temperature as that for the recovery process for the film 15 having no ash accumulated thereon, in other words, with no need of decreasing the target temperature, will be referred to a "normal recovery process".

It is determined that the amount of the ash accumulated on the filter 15 is equal to or larger than the threshold value when the difference between the differential pressure of the filter before the filter recovery process and the differential pressure of the filter after the filter recovery process is equal to or larger than a predetermined value, or when the differential pressure of the filter 15 after the filter recovery process is equal to or larger than a predetermined value. The threshold value is set to be smaller than the amount of the accumulated ash which may excessively increase the temperature of the filter 15 upon the normal recovery process for the filter 15 having the predetermined amount of PM accumulated thereon. It is preferable to set the threshold value to the maximum accumulated ash amount that will not excessively increase the temperature of the filter 15 upon the normal recovery process for the filter 15 having the predetermined amount of PM accumulated thereon.

Figure 2:
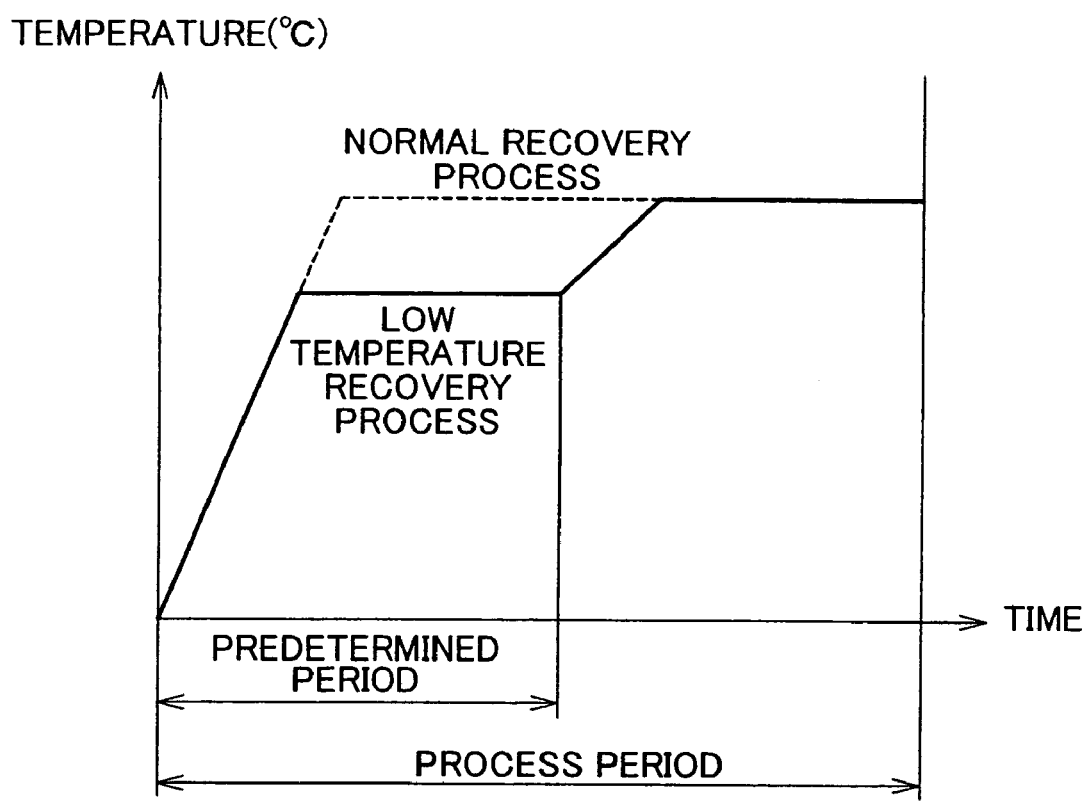
FIG. 2 is a view that shows a change in the filter temperature during the filter recovery process according to the embodiment.

When the target temperature of the filter upon the filter recovery process is low, the PM oxidizing reaction speed decreases, thus reducing the amount of the PM removed through oxidization per unit of time. Assuming that the same amount of the PM is accumulated on the filter 15, the time required for removing all the accumulated PM through oxidization in the low temperature recovery process becomes longer than that for the normal recovery process. Accordingly if the low temperature recovery process is performed over the entire period of time, the fuel efficiency may be deteriorated. In the embodiment, the low temperature recovery process is not continuously performed for completely removing the accumulated PM through oxidization. Preferably, as shown in FIG. 2, the low temperature recovery process is performed for a predetermined period of time so as to remove part of the PM accumulated on the filter 15 through oxidization, and then, the normal recovery processing is performed. It is preferable to set the aforementioned predetermined period of time as the one taken for the amount of the accumulated PM to be equal to or smaller than a reference value in the low temperature recovery process. Preferably the reference value is set as the maximum value of the accumulated PM amount that will not cause excessive increase in the temperature of the filter to be melted even if the PM oxidizing reaction at the normal recovery process increases the filter temperature.

The predetermined period of time taken from start of the low temperature recovery process to the time when the accumulated PM amount becomes equal to or smaller than the reference value may vary depending on the amount of the ash accumulated on the filter 15. The correlation between the amount of the accumulated ash and the predetermined period of time is experimentally obtained and stored in the ROM of the ECU 22 in the form of the map. Upon performance of the low temperature recovery process by the ECU 22, the predetermined period of time is derived in reference to the map such that the normal recovery process is performed upon elapse of the predetermined period of time from start of the low temperature recovery process.

As the PM oxidizing reaction speed can be calculated based on the filter temperature at the filter recovery process, the ECU 22 is capable of obtaining the amount of the PM removed through oxidization after start of the recovery process. The amount of PM accumulated on the filter may be obtained by subtracting the removed PM amount through oxidization after start of the recovery process from the predetermined amount, that is, the PM accumulated amount upon start of the filter recovery process. In the ECU 22, the removed PM amount through oxidization after start of the filter recovery process is subtracted from the predetermined value so as to obtain the amount of PM accumulated on the filter. Accordingly, the accumulated PM amount is calculated at appropriately timings after start of the low temperature recovery process such that the low temperature recovery process is continued until the calculated amount of the PM accumulated on the filter becomes equal to or smaller than the reference value. Then the low temperature recovery process is stopped and the normal recovery process is started.

Figure 3:
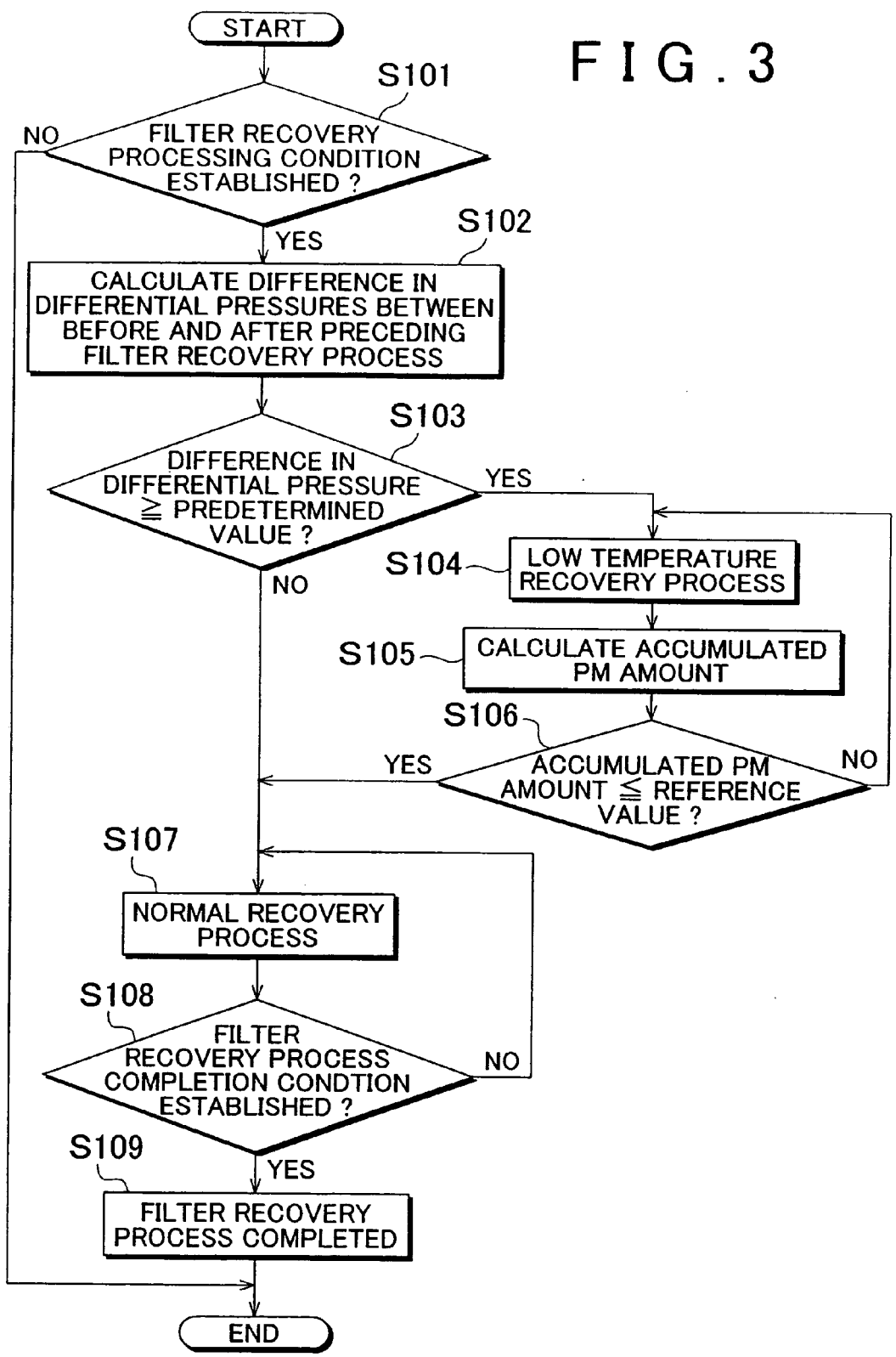
FIG. 3 is a flowchart of a control routine for the filter recovery process according to the embodiment of the invention.

In the embodiment, the ECU 22 serves to select the recovery process mode between the normal recovery process and the low temperature recovery process. The process is periodically executed as an interruption based on the crank position sensor or an interruption at a predetermined time interval. The aforementioned process will be described referring to the flowchart of FIG. 3.

The control routine is preliminarily stored in the ROM of the ECU 22. First in step (hereinafter, step will be abbreviated simply as S) 101, it is determined whether the filter recovery process conditions have been established. If it is determined that the filter recovery process conditions have been established, the process proceeds to S102. If it is not determined that the filter recovery process conditions have been established, the routine ends.

In S102, the difference between the differential pressure of the filter 15 before the preceding filter recovery process and the differential pressure of the filter 15 after the preceding filter recovery process is calculated. The aforementioned calculation is performed based on output signals of the upstream pressure sensor 18 and the downstream pressure sensor 19, which have been input to the ECU 22 and temporarily stored in the RAM in the basic routine executed before and after the filter recovery process. Preferably, the differential pressure of the filter 15 is detected in a normal operating state of the internal combustion engine where variation in the exhaust pressure is small enough to obtain accurate detection results.

The process proceeds to S103 where it is determined whether the difference in the differential pressure calculated in S102 is equal to or larger than a predetermined value such that a determination is made whether the amount of the ash accumulated on the filter 15 is equal to or larger than a threshold value. If YES is obtained in S103, that is, the amount of the ash accumulated on the filter 15 is equal to or larger than the threshold value, the process proceeds to S104. In S104, the low temperature recovery process is executed instead of the normal recovery process so as to prevent excessive increase in the temperature of the filter 15.

If NO is obtained in S103, that is, the amount of the ash accumulated on the filter 15 is smaller than the threshold value, the process proceeds to S107 where the normal recovery process is executed. In this case, the temperature of the filter 15 is not excessively increased even if the normal recovery process is executed. Execution of the normal recovery process may accelerate the recovery of the filter at an earlier stage.

The recovery process mode is selected between the low temperature recovery process and the normal recovery process depending on the result of the determination made in S103. In other words, the target temperature of the filter upon the recovery process is selected between the temperature for the low temperature recovery process and the temperature for the normal recovery process depending on the result of the determination made in S103. Accordingly S103 serves to set the target temperature of the filter.

In S105, a present value of the accumulated PM amount is calculated in the same manner as aforementioned. Then the process proceeds to S106 where it is determined whether the value of the accumulated PM amount calculated in S105 is equal to or smaller than the reference value. If NO is obtained in S105, the process returns to S104 so as to be executed again. If YES is obtained in S105, the process proceeds to S107 where the normal recovery process is executed.

In S108, it is determined whether the filter recovery process completion conditions have been established. The aforementioned determination is made by determining whether the aforementioned process period has been elapsed, or the calculated accumulated PM amount becomes zero. If YES is obtained in S108, the process proceeds to S109 where the filter recovery process is completed, and the routine ends. If NO is obtained in S108, the process returns to S107 so as to be executed again.

The excessive increase in the filter temperature may be prevented by selecting the recovery process mode between the low temperature recovery process and the normal recovery process. The recovery process mode will be switched from the low temperature recovery process to the normal recovery process when the accumulated PM is partially removed through oxidization, and the accumulated PM amount becomes equal to or smaller than the reference value. This makes it possible to complete the filter recovery process at an earlier stage compared with the case where the low temperature recovery process is continuously performed. Accordingly, deterioration in the fuel efficiency owing to the low temperature recovery process may be avoided.

The filter recovery process starts when the filter recovery process conditions are established, that is, the PM amount accumulated on the filter 15 becomes equal to or larger than the predetermined value. The time interval for performing the filter recovery process may be kept constant irrespective of the amount of the ash accumulated on the filter.

In the aforementioned embodiment, the low temperature recovery process is continuously performed from the initial stage of the filter recovery until an elapse of a predetermined period of time. However, the target temperature in the temperature increasing process at the filter recovery process may be changed depending on the amount of the accumulated PM after start of the low temperature recovery process. The target temperature may be gradually increased as the PM accumulated on the filter at the initial stage is gradually removed through oxidization.

In the aforementioned embodiment, the recovery process mode is selected between the low temperature recovery process and the normal recovery process depending on the determination whether the amount of the ash accumulated on the filter 15 is equal to or smaller than the threshold value. However, the target temperature in the temperature increasing process for the filter recovery process may be changed depending on the amount of the ash accumulated on the filter 15. Even if the amount of the ash accumulated on the filter 15 is smaller than the threshold value, the target temperature in the temperature increasing process for the filter recovery may be set to be higher than the target temperature as the threshold value for the filter 15 having the ash accumulated thereon but to be lower than the target temperature for the filter 15 having no ash accumulated thereon.

In the embodiment, the upstream and the downstream sensors 18, 19 detect the pressure at the upstream side and the downstream side of the filter 15, respectively so as to obtain the difference in the pressure between the upstream side and the downstream side. A differential pressure sensor may be provided for detecting the pressure difference between the upstream side and the downstream side of the filter 15 instead of the aforementioned upstream and the downstream sensors 18, 19. Based on the output value of the differential pressure sensor, the amount of the ash accumulated on the filter 15 may be obtained.

What is claimed is:

1. An exhaust emission control system for an internal combustion engine, comprising:
   a filter which is provided in an exhaust passage of the internal combustion engine so as to trap a particulate matter and ash contained in exhaust gas; and
   a controller that:
   estimates an amount of the particulate matter trapped and accumulated on the filter;
   estimates an amount of the ash trapped and accumulated on the filter; and
   issues a command to start a filter recovery process by controlling a temperature of the filter to a target temperature to bring an inside of the filter into an oxidizing atmosphere such that the particulate matter trapped and accumulated on the filter is removed through oxidization when the estimated amount of the particulate matter trapped and accumulated on the filter exceeds a predetermined amount, wherein the target temperature is set by the controller based on the estimated amount of the ash trapped and accumulated on the filter.

2. The exhaust emission control system according to claim 1, wherein when the estimated amount of the ash is equal to or larger than a threshold value, the target temperature is determined to be lower than the target temperature to be set when the estimated amount of the ash is smaller than the threshold value.

3. The exhaust emission control system according to claim 2, wherein when the estimated amount of the ash is equal to or larger than the threshold value, the target temperature is determined to be lower than the target temperature to be set when the estimated amount of the ash is smaller than the threshold value for a predetermined period of time elapsing from the start of the filter recovery process.

4. The exhaust emission control system according to claim 3, wherein the predetermined period of time is set to be taken for the estimated amount of the particulate matter to become equal to or smaller than a reference value.

5. The exhaust emission control system according to claim 4, wherein the controller calculates an amount of the particulate matter that has been removed through oxidization after the start of the filter recovery process, and subtracts the calculated amount of the removed particulate matter from the predetermined amount of the particulate matter so as to obtain an amount of the particulate matter accumulated on the filter.

6. An exhaust emission control method for an internal combustion engine, in which a filter provided in an exhaust passage of the internal combustion engine is used to trap a particulate matter and ash contained in exhaust gas, comprising:

estimating an amount of the particulate matter trapped and accumulated on the filter;

estimating an amount of the ash trapped and accumulated on the filter; and starting a filter recovery process by controlling a temperature of the filter to a target temperature to bring an inside of the filter into an oxidizing atmosphere such that the particulate matter trapped and accumulated on the filter is removed through oxidization when the estimated amount of the particulate matter trapped and accumulated on the filter exceeds a predetermined amount, wherein the target temperature is set based on the estimated amount of the ash trapped and accumulated on the filter.

7. The exhaust emission control method according to claim 6, wherein when the estimated amount of the ash is equal to or larger than a threshold value, the target temperature is determined to be lower than the target temperature to be set when the estimated amount of the ash is smaller than the threshold value.

8. The exhaust emission control method according to claim 7, wherein when the estimated amount of the ash is equal to or larger than the threshold value, the target temperature is determined to be lower than the target temperature to be set when the estimated amount of the ash is smaller than the threshold value for a predetermined period of time elapsing from the start of the filter recovery process.

9. The exhaust emission control method according to claim 8, wherein the predetermined period of time is set to be taken for the estimated amount of the particulate matter to become equal to or smaller than a reference value.

10. The exhaust emission control method according to claim 9, wherein an amount of the particulate matter that has been removed through oxidization after the start of the filter recovery process is calculated, and the calculated amount of the removed particulate matter is subtracted from the predetermined amount of the particulate matter so as to obtain an amount of the particulate matter accumulated on the filter.

11. An exhaust emission control system for an internal combustion engine, comprising:

a filter provided in an exhaust passage of the internal combustion engine so as to trap a particulate matter and ash contained in exhaust gas;

accumulated particulate matter amount estimating means for estimating an amount of the particulate matter trapped and accumulated on the filter;

accumulated ash amount estimating means for estimating an amount of the ash trapped and accumulated on the filter, and filter recovery processing means for issuing a command to start a filter recovery process by controlling a temperature of the filter to a target temperature to bring an inside of the filter into an oxidizing atmosphere such that the particulate matter trapped and accumulated on the filter is removed through oxidization when the estimated amount of the particulate matter trapped and accumulated on the filter exceeds a predetermined amount, wherein the filter recovery processing means includes target temperature setting means for setting the target temperature, and wherein the filter recovery processing means sets the target temperature based on the estimated amount of the ash trapped and accumulated on the filter by the accumulated ash amount estimating means.

* * * * *